US006738562B1

(12) United States Patent
Takeuchi

(10) Patent No.: US 6,738,562 B1
(45) Date of Patent: May 18, 2004

(54) OPTICAL DISC PLAYBACK APPARATUS

(75) Inventor: Katsuyuki Takeuchi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 624 days.

(21) Appl. No.: 09/665,956

(22) Filed: Sep. 21, 2000

(30) Foreign Application Priority Data

Sep. 24, 1999 (JP) ............................................ 11/271123

(51) Int. Cl.[7] .................................................. H04N 5/85
(52) U.S. Cl. ........................................ 386/96; 386/126
(58) Field of Search ............................... 386/46, 95, 98, 386/111, 112, 96, 104, 125, 126; 369/303

(56) References Cited

U.S. PATENT DOCUMENTS 5,651,087 A * 7/1997 Nagano et al. ............. 386/126
5,970,205 A * 10/1999 Nakamura et al. ............ 386/68
6,215,476 B1 * 4/2001 Depew et al. .............. 345/132

FOREIGN PATENT DOCUMENTS

JP            10-243363           9/1998

* cited by examiner

*Primary Examiner*—Huy Nguyen
(74) *Attorney, Agent, or Firm*—Wenderoth, Lind & Ponack, L.L.P.

(57) ABSTRACT

In an optical disc playback apparatus OPP for reproducing data recorded on an optical disc Od and outputting an on-screen message (OSM) to be displayed in a predetermined number (10) of display lines, a reader 12, 13, 14, 15 reads out record data Si from a recording surface of the optical disc Od. An on-screen message generator 16, 1A generates a digital character signal sequence to be displayed as the on-screen message (OSM). An on-screen message lines controller 16; Ssw; #400 controls the on-screen message generator to change the number of display lines in which the on-screen is displayed, based on the record data.

10 Claims, 12 Drawing Sheets

OPTICAL DISC PLAYBACK APPARATUS

BACKGROUND OF THE INVENTION

1. Field of the Invention

The present invention relates to optical disc playback apparatuses and, more specifically, to an optical disc playback apparatus for displaying, on a television screen, an on-screen message in the predetermined number of lines changeable to an image display format of data recorded on an optical disc being played back.

2. Description of the Background Art

Recently, video CD players which are CD players incorporated with MPEG1 (Moving Picture Coding Experts Group1) decoding feature are widely available. Such video CD players are capable of reproducing images and sounds for maximum of 74 minutes from moving picture data and audio data recorded on video CDs and Karaoke CDs, wherein such data is digitally compressed by MPEG1 technique. Further,CVDs (China Video CDs) and SVCDs (Super Video CDs) with higher quality of image and audio data are commercialized especially focusing on the Chinese market. The CVDs and the SVCDs are realized with MPEG2 (Moving Picture Coding Experts Group2) decoding feature-instead of MPEGI, and can be played back without any modification on mechanism such as optical pickup, servo technique, and signal processing technique for the MPEG1.

Mainly in the Japanese and US markets, DVD players incorporated with the MPEG2 decoding feature are commercialized. The DVD players are capable of reproducing maximum of 133 minutes of high-quality moving pictures with high-resolution defined by horizontally 702 dots and vertically 480 lines, together with high-quality sound. In addition to the higher quality of reproduced images and sounds, advanced features are achieved in these video CD players and DVD players. Such advanced features are quite convenient for sophisticated users who are familiar with such features to enjoy various functions. On the other hand, it is difficult for ordinary users due to complicated operation required to utilize the functions. To ease the user's inconvenience caused by the complicated operability, the video CD players and DVD players recently adopt an OSD (On-Screen Display) function. The function is for displaying information for user's easy operation on a monitor for reproduced pictures. Such information indicates input information corresponding to user's operation, an elapsed time after start of reproduction, a status of the player during reproduction, special reproduction function, and a type of optical disc. The information is referred to as an on-screen message (OSM).

Hereinafter, by referring to FIGS. 10, 11, and 12, examples of conventional optical disc playback apparatuses are described. In FIG. 10, a first example of the conventional optical disc playback apparatus is shown. In a conventional optical disc playback apparatus OPC1 of this example, an optical disc Od, typically a music CD, is fixedly placed on a spindle motor 72 for rotation. An optical pickup 73 applies a laser beam Lb onto the recording surface of the rotating optical disc Od to read out data therefrom as digital signals.

An optical servo controller 74 executes a servo-control of the spindle motor 72 and the optical pickup 73. A digital signal processor 75 demodulates the digital signals from the optical pickup 73 to convert the signals into sub-code information, control information, a sequence of CD-DA signals unique to the music CD, and a sequence of other signals. Based on the sub-code information and the control information supplied from the digital signal processor 75, a system controller 76 determines the type of the optical disc being played back and detects system errors such as track jumps and focus errors of the laser beam Lb.

An information signal sequence separator 79 separates the digital signal sequences supplied from the digital signal processor 75 into the CD-DA signal sequence and the other signal sequence.

An MPEG1 decoder 78 receives the CD-DA signal sequence and the other signal sequence from the information signal sequence separator 79. If the CD-DA signal sequence is received, the MPEG1 decoder 78 outputs the received signal sequence as it is by using memory 77 as buffer memory. On the other hand, if the signal sequence other than the CD-DA signal sequence is received, the MPEG1 decoder 78 reads disc information on the optical disc Od to determine whether the image display format of the video recorded thereon (signal sequence other than the CD-DA signal sequence) is the PAL or the NTSC.

Further, by using the memory 77 as buffer memory, the MPEG1 decoder 78 converts the video signal sequence (signal sequence other than the CD-DA signal sequence) in real time into a decoded digital signal sequence. Note that if the video is in the PAL format, the video signal sequence is converted into a decoded digital signal sequence in the PAL format. If the video is in the NTSC format, the video signal sequence is converted into a decoded digital signal sequence in the NTSC format.

An on-screen display controller 7A converts character data and character display information from the system controller 76 into a digital character signal sequence.

A video signal D/A converter 7B converts the decoded digital signal sequence from the MPEG1 decoder 78 and the digital character signal sequence from the on-screen display controller 7A into analog video signals.

An audio signal D/A converter 7C converts the CD-DA signal sequence from the MPEG1 decoder 78 into analog audio signals.

The playback operations of the optical disc playback apparatus OPC1 are described with respect to a music CD and other type of optical disc, respectively. For playing back the music CD, the digital signal processor 75 starts demodulation of the digital signals and then outputs the control information and the sub-code information.

When the system controller 76 determines that the signal sequence is the CD-DA signal sequence based on the control information and the sub-code information, the system controller 76 judges that no video signal sequence is recorded on the optical disc Od. In such case, the system controller 76 transmits a control instruction instructing the digital signal processor 75 to output border color signals (normally blueback) in the NTSC format instead of the video signals. The system controller 76 further outputs the character display information and the character data to the on-screen display controller 7A.

The system controller 76 monitors the system errors such as track lumps and focus errors. Whenever such error occurs, the system controller 76 instructs the optical servo controller 74 so that the optical pickup 73 and the spindle motor 72 return to initial states thereof.

The MPEG1 decoder 78 receives the CD-DA signal sequence from the digital signal processor 75 and outputs the same by using the memory 77 as buffer memory. The MPEG1 decoder 78 also converts the border color signals in the NTSC format from the digital signal processor 75 into the decoded digital signal sequence.

The on-screen display controller 7A receives the character display information from the system controller 76, and sets the number of character display lines of an on-screen message to 10. The on-screen display controller 7A further receives and converts the character data into the digital character signal sequence.

The video signal D/A converter 7B converts the decoded digital signal sequence from the MPEG1 decoder 78 and the digital character signal sequence from the on-screen display controller 7A into the analog video signals.

The audio signal D/A converter 7C converts the CD-DA signal sequence from the MPEG1 decoder 78 into the analog audio signals.

Described next is the operation of the optical disc playback apparatus OPC1 for playing back the optical disc Od other than the music CD. For playing back the optical disc Od, the digital signal processor 75 starts demodulation of the digital signals and then outputs the control information and the sub-code information as well as the signal sequence other than the CD-DA signal sequence.

Based on the control information and the sub-code information from the digital signal processor 75, the system controller 76 judges that the signal sequence is other than the CD-DA signal sequence. The system controller 76 also monitors the system errors such as track jumps and focus errors. Whenever such error occurs, the system controller 76 instructs the optical servo controller 74 so that the optical pickup 73 and the spindle motor 72 return to initial states thereof.

The information signal sequence separator 79 separates the digital signal sequences from the digital signal processor 75 into the CD-DA signal sequence and the other signal sequence.

The MPEG1 decoder 78 receives the CD-DA signal sequence and the other signal sequence from the information signal sequence separator 79. The MPEG1 decoder 78 converts, in real time, the video signal sequence into a decoded digital signal sequence in the PAL format if the video recorded on the optical disc Od is in the PAL format, and into a decoded digital signal sequence in the NTSC format, if in the NTSC format.

The on-screen display controller 7A receives the character display information from the system controller 76, and sets the number of character display lines of an on-screen message to 10. Further, the on-screen display controller 7A receives the character data and converts it into the digital character signal sequence.

The video signal D/A converter 7B converts the decoded digital signal sequence from the MPEG1 decoder 78 and the digital character signal sequence from the on-screen display controller 7A into the analog video signals.

The audio signal D/A converter converts the CD-DA signal sequence from the MPEG1 decoder 78 into the analog audio signals.

Next, in FIG. 11, a second example of the conventional optical disc playback apparatus is shown. An optical disc playback apparatus OPC2 of the example includes an MPEG1 decoder 88 in which the MPEG1 decoder 78 and the on-screen display controller 7A of the optical disc playback apparatus OPCL shown in FIG. 10 are integrally constructed.

Consequently, the MPEG1 decoder 88 converts the character display information and the character data from the system controller 76 into the digital character signal sequence. Further, the MPEG1 decoder 88 can output the converted digital character signal sequence together with the decoded digital signal sequence. Since the operation of the optical disc playback apparatus OPC2 for playing back the optical disc Od is basically the same as that of the optical disc playback apparatus OPC1 except for the above described operation related to the MPEG1 decoder 88, the description thereof is omitted herein.

With the conventional configurations exemplarily described in the above, however, the number of display lines of the on-screen message on a television screen is fixed to 10 whether the television image displayed thereon is in the PAL format or the NTSC format. As a result, if the on-screen display controller sets the on-screen message to be arranged evenly on the television screen in the NTSC format, the display lines of such message are upwardly shifted by approximately 20% of the screen when displayed on the television screen in the PAL format.

In FIG. 12, shown is one example of the on-screen message set for the NTSC format screen being displayed on the television screen in the PAL format. On the left half of the drawing, an on-screen message MSG is shown. Here, the on-screen message MSG is displayed on the television screen in the NTSC format with a total character display lines of 10 indicated by lines Ln 1 to Ln 10, which are evenly arranged thereon.

On the right half of the drawing, shown is a screen display MSGc, where the on-screen message MSG is displayed on the television screen in the PAL format.

The PAL format adopts 625 vertical scanning lines while the NTSC format adopts 525 vertical scanning lines. That is, the PAL format has approximately 1.2 times scanning lines when compared with the NTSC format. Therefore, assuming the space between the lines of the on-screen message is kept the same as that of the NTSC format screen, the PAL format screen has a display region of 12 lines shown as Lp 1 to Lp 12.

Accordingly, if the message MSG is displayed on the PAL format television screen without being changed in its number of character display lines, which is fixedly set to 10 for the NTSC format, a display region of approximately 2 lines remain unused. Although the example in the drawing shows the case with the bottom 2 lines of the PAL format screen (Lp 11, Lp 12) remain unused, it is needless to say that the same may be happen for the top 2 lines (Lp 1, Lp 2).

The present invention aims to solve the problem above and to provide an optical disc playback apparatus capable of properly displaying the on-screen message on a screen. When playing back a video CD, Karaoke CD, or DVD, a type of the optical disc and an image display format predetermined for data being reproduced are determined, and based on the determination, the number of character display lines of an on-screen message is set.

In more detail, an object of the present invention is to provide an optical disc playback apparatus capable of setting the number of character display lines of an on-screen message to 10 for the video in the NTSC format and to 12 for the video in the PAL format. Thus, the on-screen message is displayed on a television screen without the character display region being shifted even for the video in the PAL format. The unused portion in the bottom of the display region can be utilized to display the characters evenly on the entire screen.

SUMMARY OF THE INVENTION

A first aspect of the present invention is directed to an optical disc playback apparatus for reproducing data recorded on an optical disc and outputting an on-screen message to be displayed in a predetermined number of lines. The apparatus in accordance with the first aspect of the present invention comprises a reader for reading record data from a recording surface of the optical disc; an on-screen message generator for generating a digital character signal sequence to be displayed as the on-screen message; and an on-screen message lines controller for controlling the on-screen message generator to change a number of lines in which the on-screen message is displayed based on the record data.

As described above, in the first aspect, the number of display lines of the on-screen message can be set appropriately depending on the data recorded on the optical disc.

According to a second aspect, in the first aspect, the apparatus further comprises an optical disc determination unit for determining atype of the optical disc based on the record data, wherein the on-screen message lines controller controls the on-screen message generator to set the number of lines in which the on-screen message is displayed to 10 lines when the optical disc is determined as a music CD.

As described above, in the second aspect, the number of display lines of the on-screen message can be set appropriately depending on the type of the optical disc.

According to a third aspect, in the second aspect, the apparatus further comprises a display format determination unit for determining a display format of the data to be reproduced based on the record data wherein the on-screen message lines controller controls the on-screen message generator to set the number of lines in which the on-screen message is displayed to 10 lines when the optical disc is determined as a disc other than the music CD and when the display format of the data to be reproduced is determined as an NTSC format.

As described above, in the third aspect, the effect in the second aspect can be similarly obtained.

According to a fourth aspect, in the second aspect, the apparatus further comprises a display format determination unit for determining a display format of the data to be reproduced based on the record data, wherein the on-screen message lines controller controls the on-screen message generator to set the number of lines in which the on-screen message is displayed to 12 lines when the optical disc is determined as a disc other than the music CD and when the display format of the data to be reproduced is determined as a PAL format.

As described above, in the fourth aspect, the effect in the third aspect can be similarly obtained.

According to a fifth aspect, in the first aspect, the apparatus further comprises a display format optical determination. unit for determining a display format of the data to be reproduced based on the record data, wherein the on-screen message lines controller controls the on-screen message generator to set the number of lines in which the on-screen message is displayed to 10 lines when the display format of the datato be reproduced is determined as an NTSC format.

As described above, in the fifth aspect, in addition to the effect obtained in the first aspect, the number of display lines of the on-screen message can be set appropriately for data varying in the display format on the same optical disc.

According to a sixth aspect, in the first aspect, the apparatus further comprises a display format optical determination unit for determining a display format of the data to be reproduced based on the record data wherein the on-screen message lines controller controls the on-screen message generator to set the number of lines in which the on-screen message is displayed to 12 lines when the display format of the data to be reproduced is determined as a PAL format.

As described above, in the sixth aspect, the effect in the fifth aspect can be similarly obtained.

According to a seventh aspect, in the second aspect, the optical disc determination unit determines the type of the optical disc based on a control bit of a TOC included in the record data.

According to an eighth aspect, in the third aspect, the display format determination unit determines the display format of the data to be reproduced based on a sequence header included in the record data.

According to a ninth aspect, in the first aspect, the apparatus further comprises a signal sequence separator for separating a first music CD signal sequence and a non-music CD signal sequence which is a signal sequence other than the first music CD signal sequence; a digital signal processor for converting video signals included in the separated non-music CD signal sequence into a decoded digital signal sequence and converting audio data included in the non-musicCD signal sequence into a second music CD signal sequence; a video signal converter for converting the decoded digital signal sequence and the digital character signal sequence into analog video signals; and an audio signal converter for converting the first music CD signal sequence and the second music CD signal sequence into analog audio signals.

According to a tenth aspect, in the ninth aspect, the digital signal processor is capable of decoding an MPEG2 signal sequence.

According to an eleventh aspect, inthe ninth aspect, the digital signal processor is capable of decoding an MPEC4 signal sequence.

A twelfth aspect of the present invention is directed to an optical disc playback method for reproducing data recorded on an optical disc and outputting an on-screen message to be displayed in a predetermined number of lines. The method in accordance with the twelfth aspect of the present invention comprises reading record data from a recording surface of the optical disc; and generating a digital character signal sequence to be displayed as the on-screen message and chanying a number of lines in which the on-screen message is displayed based on the record data.

As described above, in the twelfth aspect, the number of display lines of the on-screen message can be set appropriately depending on the data recorded on the optical disc.

These and other objects, features, aspects and advantages of the present invention will become more apparent from the following detailed description of the present invention when taken in conjunction with the accompanying drawings.

DESCRIPTION OF THE PREFERRED EMBODIMENT

First, by referring to FIGS. 1 to 5, an optical disc playback apparatus according to one embodiment of the present invention is described. Thereafter, by referring to FIGS. 6 and 7, and further by referring to FIGS. 8 and 9, first and second alternatives of the optical disc playback apparatus according to the embodiment of the present invention are described, respectively.

Figure 1:
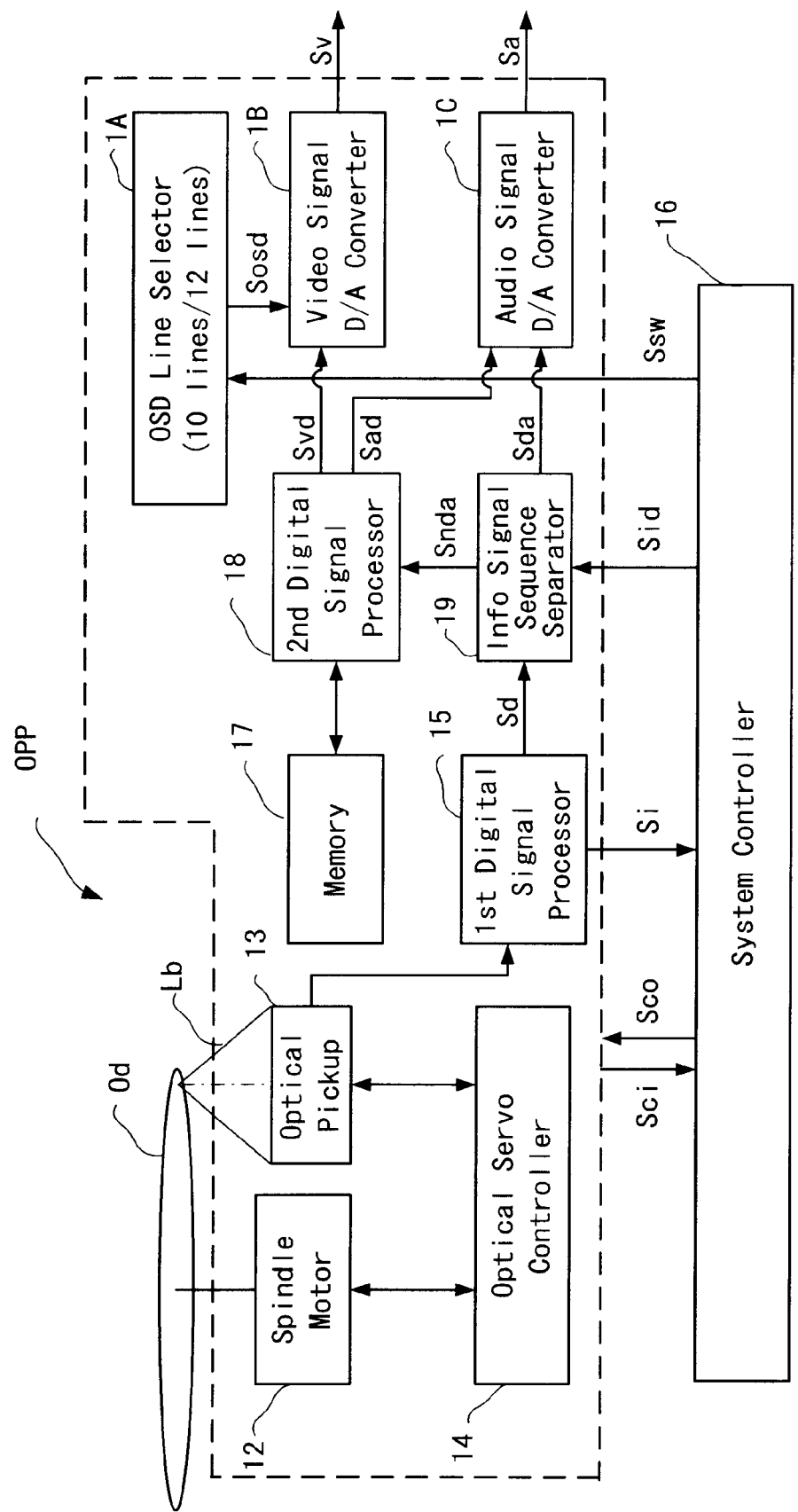
FIG. 1 is a block diagram showing the structure of an optical disc playback apparatus according to one embodiment of the present invention.

In FIG. 1, the structure of an optical disc playback apparatus OPP according to the embodiment of the present invention is shown. The optical disc playback apparatus OPP includes a spindle motor 12, an optical pickup 13, an optical servo controller 14, a first digital signal processor 15, a system controller 16, memory 17, a second digital signal processor 18, an information signal sequence separator 19, an on-screen display line selector 1A, a video signal D/A converter 1B, and an audio signal D/A converter 1C.

The spindle motor 12 fixes an optical disc Od to be played back on itself, and rotates the fixed disc. The optical pickup 13 applies a laser beam Lb onto the recording surface of the rotating optical disc Od, and then receives the laser beam Lb reflected by the recording surface to read data recorded thereon as digital signals. The optical servo controller 14 executes a servo-control of the spindle motor 12 and the optical pickup 13. The optical servo controller 14 generates a servo operation signal indicating servo operation, and outputs the same to the system controller 16.

The first digital signal processor 15 demodulates the digital signals from the optical pickup 13 to convert the demodulated digital signals into sub-code information, control information, a CD-DA signal sequence unique to a music CD, and another signal sequence that. The first digital signal processor 15 then outputs the sub-code information and the control information to the system controller 16 as an information signal Si. The first digital signal processor 15 also outputs the CD-DA signal sequence and the other signal sequence as decoded signal sequences Sd to the information signal sequence separator 19. Note that, hereinafter in the specification, the CD-DA signal sequence unique to the music CD and the other signal sequence are referred to as a music CD signal sequence Sda and a non-music CD signal sequence Snda, respectively. The non-music signal sequence Snda includes the decoded signal sequence Sd read out from a video CD on which video data and audio data are recorded as combined data, for example.

Based on the information signal Si from the first digital signal processor 15, the system controller 16 determines whether the decoded signal sequence Sd currently being outputted from the first digital signal processor 15 is the music CD signal sequence Sda or the non-music CD signal sequence Snda. Based on the determination, the system controller 16 generates a determination instruction Sid and a control signal Ssw. The determination instruction Sid is supplied to the information signal sequence separator 19 and the control signal Ssw is supplied to the on-screen display line selector 1A.

The system controller 16 detects system errors such as track jumps or focus errors of the laser beam LB based on the servo operation signal supplied from the optical servo controller 14, and feed-back controls the optical servo controller 14. Further, the system controller 16 generates a control signal Sco based on a processing signal Sci for entirely controlling the operation of the optical disc playback apparatus OPP. The processing signal Sci includes the above mentionedinput signal, and is supplied from each component in the optical disc playback apparatus OPP. Such control method is a known technique, and therefore, the description thereof is omitted herein.

Based on the determination instruction Sid from the system controller 16, the information signal sequence separator 19 outputs the signal sequence included in the decoded signal sequence Sd from the first digital signal processor 15. Themusic CD signal sequence Sda is outputted to the audio signal D/A converter 1C. The non-music CD signal sequence Snda is outputted to the second digital signal processor 18.

Based on the instruction (Sco) from the system controller 16, the second digital signal processor 18 converts, in real time, the non-music CD signal sequence Snda from the information signal sequence separator 19 into a decoded digital signal sequence Svd and a CD-DA signal sequence Sad, by using the memory 17 as buffer memory. The second digital signal processor 18 outputs the decoded digital signal sequence Svd, which is composed of video signals, to the video signal D/A converter 1B. The second digital signal processor 18 also outputs the CD-DA signal sequence Sad, which is composed of audio signals, to the audio signal D/A converter 1C.

The on-screen display line selector 1A determines character data and the number of character display lines of an on-screen message to be displayed on the television screen based on the control signal Ssw from the system controller 16. The on-screen message display line selector 1A then outputs a digital character signal sequence Sosd indicating the on-screen message in the determined number of display lines to the video signal D/A converter 1B.

With respect to the music CD signal sequence Sda, no video signal is recorded on the optical disc. Therefore the on-screen display line selector 1A sets the number of character display lines to 10. With respect to the non-music CD signal sequence Snda, the on-screen display line selector 1A sets the number of character display lines to 10 if the video signals recorded on the optical disc Od are in the NTSC format, and to 12 if in the PAL format.

The video signal D/A converter 1B converts both the decoded digital signal sequence Svd from the second digital signal processor 18 and the digital character signal sequence Sosd from the on-screen display line selector 1A to analog video signals Sv, and outputs the same.

The audio signal D/A converter 1C converts, the separated CD-DA signal sequence Sda from the information signal sequence separator 19 and the CD-DA signal sequence Sad from the second digital signal processor 18 into analog audio signals Sa, and outputs the same.

Figure 2:
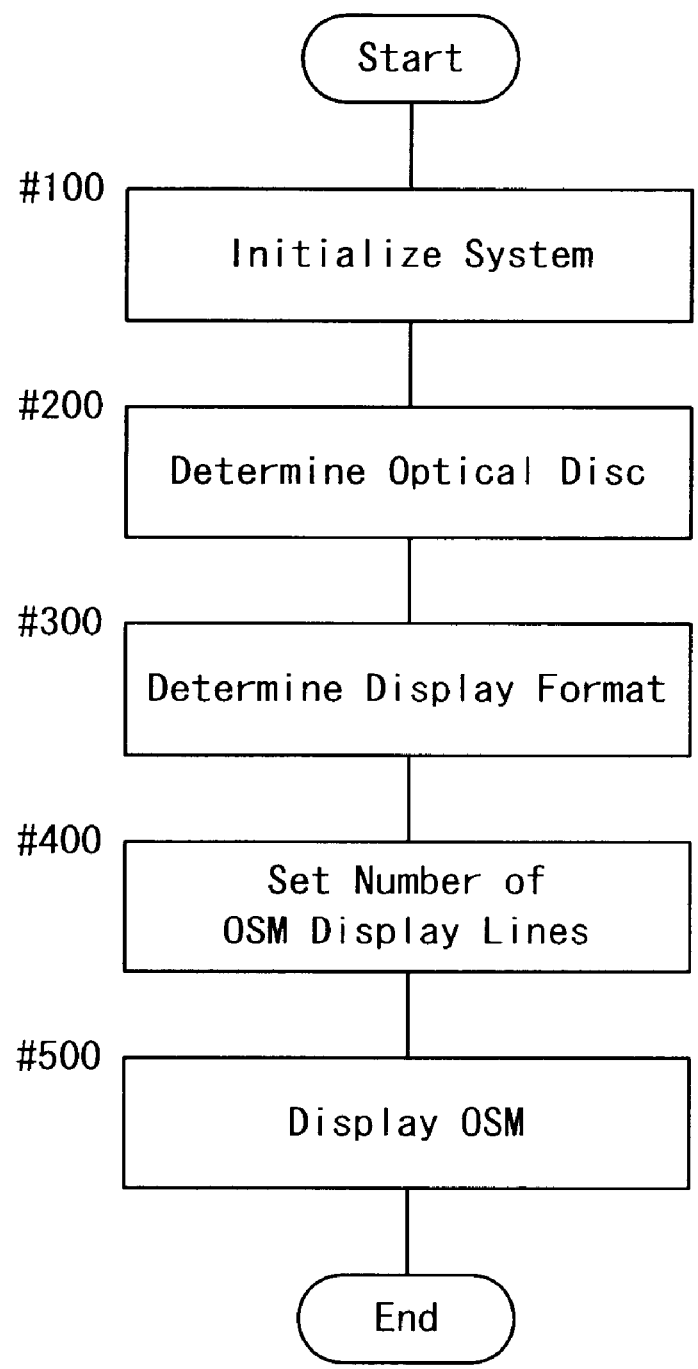
FIG. 2 is a flowchart showing the main operation of the optical disc playback apparatus of FIG. 1.
Figure 3:
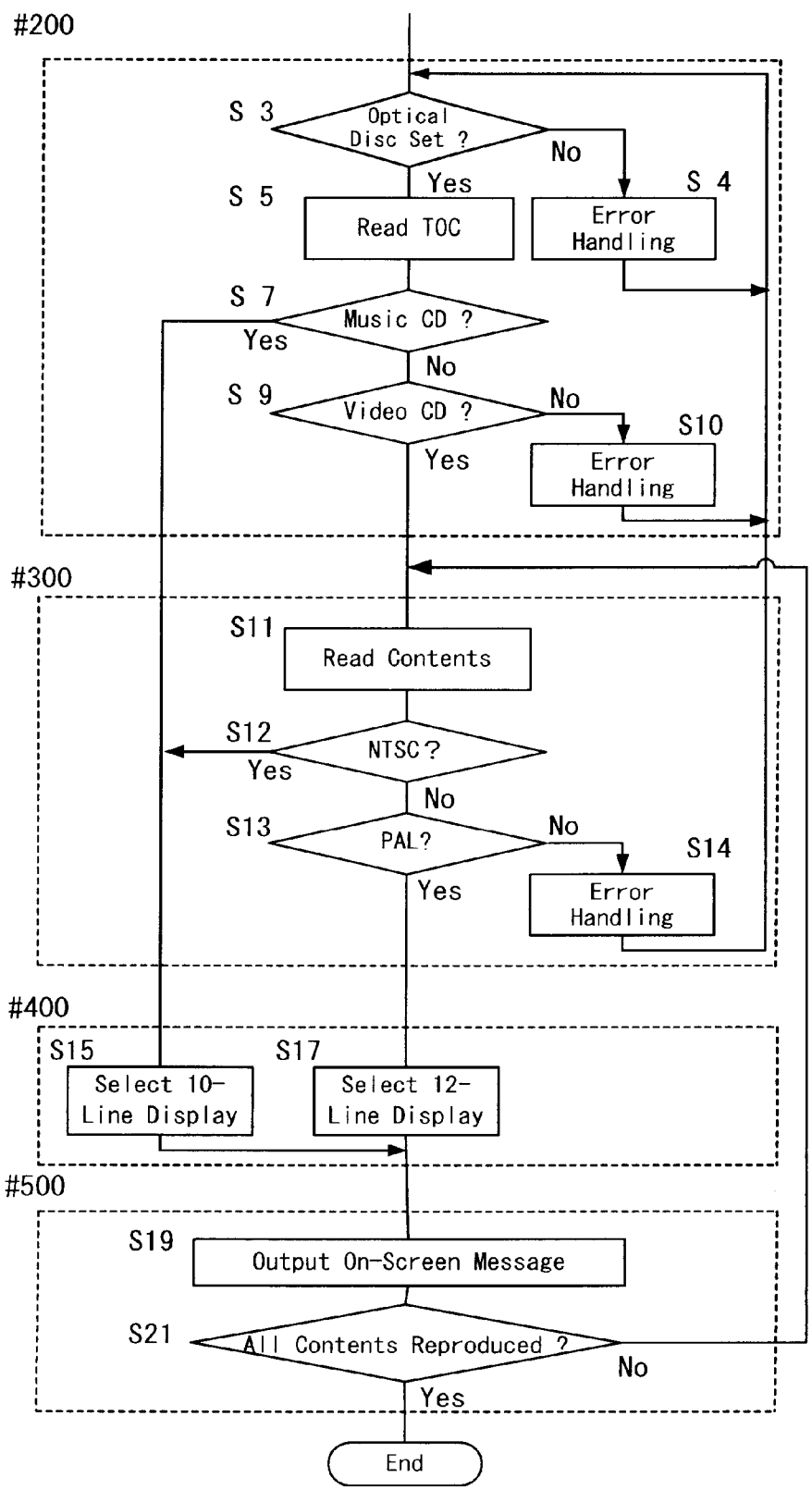
FIG. 3 is a flowchart showing main subroutines in the flowchart of FIG. 2 in detail.

By referring to flowcharts of FIGS. 2 and 3, described is the operation for selectively switching the number of character display lines of the on-screen message in the optical disc playback apparatus structured as above.

In FIG. 2, a flowchart of the main operation of the optical disc playback apparatus OPP is shown. The optical disc playback apparatus OPP is turned ON to start its operation. First, in a system initialization subroutine of step #100, the optical disc playback apparatus OPP is entirely initialized, and then the procedure goes to a next step #200.

In an optical disc determination subroutine of step #200, the type of the optical disc Od set in the optical disc playback apparatus OPP is determined. In the embodiment, the optical disc Od is determined as either the music CD or the video CD, but may be determined as an arbitrary type of the optical disc Od that records digital information thereon such as a DVD. Then the procedure advances to a next step #300.

In a display format determination subroutine of step #300, determined is the display format of an image to be reproduced from each type of the optical disc Od determined in step #200. The procedure then advances to a next step #400.

In an OSM display line setting subroutine of step #400, the number of character lines is set for the on-screen message depending on the determination results obtained in the subroutines of steps #200 and #300. The procedure then advances to a next step #500.

In an OSM display subroutine of step #500, the on-screen message is displayed in the number of lines set in step #400.

Next, by referring to FIG. 3, the procedure in the above described subroutines #200, #300, #400, and #500 is described in detail. After the system initialization of the optical disc playback apparatus OPP in step #100, the optical disc determination subroutine of step #200 is started.

[#200]

In step S3, it is detected whether the optical disc Od is set. If not, it is determined No, and the procedure advances to step S4.

In step S4, error handling such as prompting a user to set the optical disc Od is performed. In detail, under the control of the system controller 16, a display (not shown) provided on the optical disc playback apparatus OPP shows that the optical disc Od is not set. Then, the procedure returns to step S3 and waits for the optical disc Od to be set.

On the other hand, if determined Yes in step S3, meaning that that the optical disc Od is set, the procedure goes to step S5.

In step S5, the laser beam Lb is applied onto the optical disc Od to start data reproduction. First, a control bit in a TOC (Table of Contents) of the optical disc Od is read as the information signal Si. The procedure then advances to a next step S7.

In step S7, the system controller 16 determines whether the optical disc Od being played back is a music CD, based on the control bit (information signal Si) read in step S5. If a value of the control bit represented by the information signal Si indicates a music CD, the procedure advances to step S15 in the OSM display line setting subroutine #400.

On the other hand, if determined No in step S7, meaning that the optical disc Od being played back is not a music CD, the procedure advances to step S9.

In step S9, as is done in step S7, it is determined whether the optical disc Od being played back is a video CD, based on the information signal Si (control bit). If determined No, meaning that the optical disc Od is a video CD, the procedure goes to step S10.

In step S10, error handling such as prompting a user to set an appropriate optical disc Od is performed. In detail, under the control of the system controller 16, the display (not shown) provided on the optical disc playback apparatus OPP shows that the optical disc Od being set is neither a music CD nor a video CD. Then, the procedure returns to step S3 and waits for the appropriate optical disc Od being set.

Note, in the embodiment, the music CD and the video CD are exemplified as the possible optical discs Od to be played back. It is needless to say, however, the optical disc playback apparatus OPP can playback an arbitrary type of the optical disc Od by implementing the above described second digital signal processor 18 as a digital processor suitable for reproducing data on such optical disc Od.

On the other hand, if determined Yes in step S9, that is, if it is determined that the optical disc Od is a video CD, the procedure goes to step S11 in the display format determination subroutine #300.

[#300]

In step S11, contents data recorded on the optical disc Od is read. Then, the procedure advances to a next step S12.

In step S12, the system controller 16 determines whether the display format of the contents data being reproduced is in the NTSC format, based on a sequence header (information signal Si) of the contents data read in step S11. If a value of the sequence header indicates the NTSC format. it is determined Yes. The procedure advances to step S15 in the OSM display line setting subroutine #400. On the other hand, if not indicating the NTSC formnat, it is determined No, and the procedure goes to step S13.

In step S13, as is done in step S11, it is determined whether not the display format of the contents data being reproduced is in the PAL format, based on the value of the sequence header. If determined No, the procedure advances to step S14.

In step S14, error handling prompting a user to take an appropriate action such as changing the optical disc Od is performed. In detail, under the control of the system controller 16, a display (not shown) provided on the optical disc playback apparatus OPP shows that the display format of the contents data is unknown. Then, the procedure returns to step S3 and waits for another optical disc Od being set. Note that it is also possible to return the procedure to step S11 instead of step S3 after the error handling in the present step. If so, the correct contents data is waited to be reproduced from the optical disc Od currently being set.

On the other hand, if determined as the PAL format in step S13, the procedure advances to step S17 in the OSM display line setting subroutine #400.

[#400]

In step S15, the system controller 16 outputs the control signal Ssw so that the on-screen display line selector 1A selectively switches to a 10-line display mode. Note that the procedure in this step is executed if the optical disc Od is determined as a music CD in the above described step S7 of the optical disc determination subroutine #200 or if the display format is determined as the NTSC in the above described step S12 of the display format determination subroutine #300. That is to say, the on-screen message is set to be displayed in 10 lines when the audio data recorded on a music CD and the contents data in the NTSC format recorded on a video CD are reproduced. The procedure then advances to step S19 in the OSM display subroutine #500.

In step S17, the system controller 16 outputs the control signal Ssw so that the on-screen display line selector 1A selectively switches to a 12-line display mode. Note that the procedure in this step is executed if the optical disc Od is determined as a video CD in the above described step S9 of the optical disc determination subroutine #200 and also if the display format of the video CD is determined as the PAL format in the above described step S13 of the display format determination subroutine #300. That is to say, the on-screen message is set to be displayed in 12 lines when the contents data in the PAL format recorded on the video CD is reproduced. Then, the procedure advances to step S19 in the OSM display subroutine #500.

[#500]

In step S19, the on-screen message to be displayed is outputted in the number of lines designated immediately before by the control signal Ssw. Then, the procedure advances to a next step S21.

In step S21, is determined whether the production of all contenten data recorded on the optical disc Od is completed. If determined No, the procedure returns to the display format determination subroutine #300 for successively reading out the contents data from the vedeo CD, determining the display format of the read contents data, and appropriately setting the number of display lines of the on-screen messages. If the reproduction of the contents data is completed, it is determined Yes in the present step and the procedure ends.

As described in teh foregoing, in teh optical disc playback apparatus OPP of the embodiments, the information signal Si and the decoded signal sequence Sd are generated by demodulation of the digital signals read from the optical disc Od. Based on teh sub-code information included in the information signal Si, determination is made on whether the decoded signal sequence Sd is the CD-DA signal sequence, which is a basic format of a compact disc, or the other signal sequence.

If the decoded signral sequence Sd is determined as the CD-DA signal sequence, no video signal is recorded on the optical disc Od, and therefore the the number of the display lines of the on-screen message is set to 10. If the decoded signal sequence Sd is determined as the signal sequence other than the CD-DA signal, the display format of the video signal sequence being reproduced is further determined, based on the sequence header included in the information signal Si. If the display format is determined as the NTSC format, the number of display lines of the on-screen message is set to 10, and if the PAL format, to 12.

Further, the decoded signal sequence Sd is separated into the CD-DA signal sequence and the other signal sequence. The signal sequence other than the CD-DA signal is then converted, in real time, into the decoded digital signal sequence Svd and the CD-DA signal sequence Sad.

The digital character signal sequence Sosd for the on-screen display and the decoded digital signal sequence Svd are both converted into the analog video signals Sv.

The CD-DA signal sequences Sda and Sad are both converted into the analog audio signals Sa.

As described above, when a video CD, karaoke CD, CVD/SVCD, or DVD is played back, optical disc information thereof is determined. According to the determination, the on-screen display controller 1A selectively switches to the 10-line display mode for the video in the NTSC format and to the 12-line display mode for the video in the PAL format. As a result, the on-screen message is displayed on a television screen without the character display region being shifted even for the video in the PAL format. The unused portion in the bottom of the display region can be utilized to display the characters evenly on the entire screen.

Figure 4:
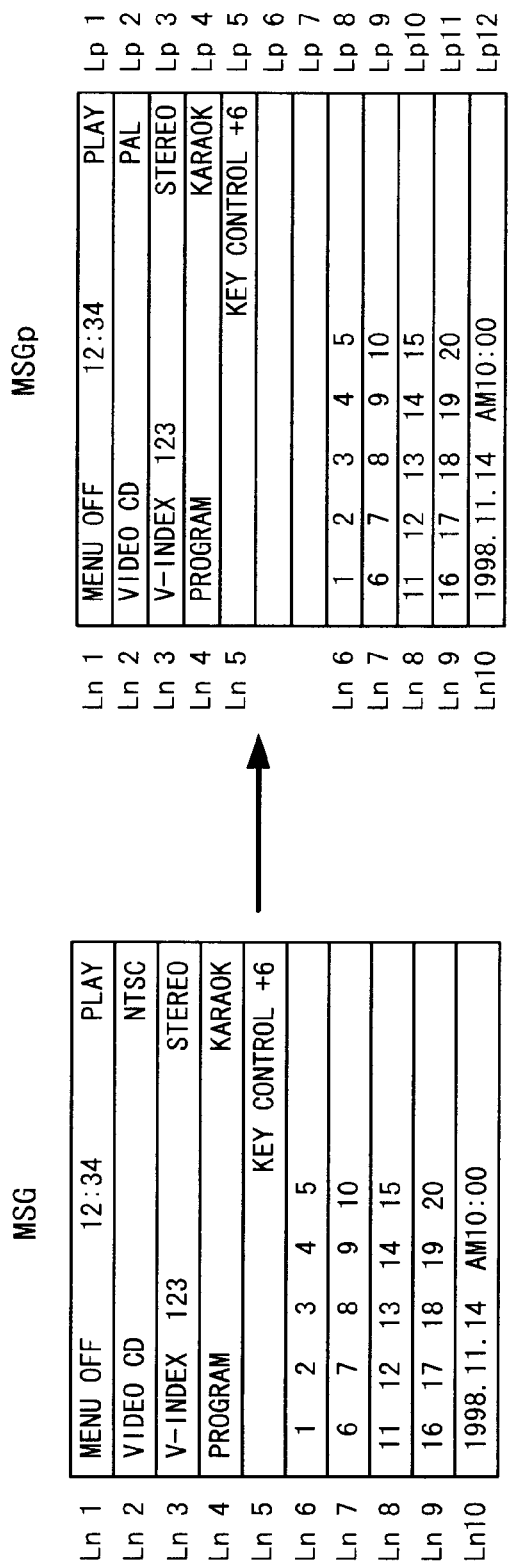
FIG. 4 is a diagram illustrating a construction of an on-screen message according to the optical disc playback apparatus of the present invention.

In FIG. 4, shown is one example of the on-screen message being displayed on the television screen in the PAL format by the optical disc playback apparatus of the embodiment. On the left half of the drawing, the on-screen message MSG is shown. Here, the on-screen message MSG is displayed on the television screen in the NTSC format with a total character display lines of 10 indicated by the lines Lnl to Ln 10, which are evenly arranged thereon. On the right half, shown is a screen display MSGp, where the on-screen message MSG is displayed on the television screen in the PAL format. The 10 lines (Ln 1 to Ln 10) of the on-screen message MSG are arranged on the screen in the PAL format which has 12 display lines in the following manner.

The upper half of the on-screen message MSG (Ln 1 to Ln 5) is arranged on the top five lines (Lp 1 to Lp 5) of the screen in the PAL format. The lower half (Ln 6 to Ln 10) is arranged on the bottom five lines (Lp 8 to Lp 12) thereof. With such arrangement, two lines on the middle of the screen display MSGP (Lp 6 and Lp 7) can be utilized for displaying an arbitrary message.

It is needless to say that each line of the on-screen message MSG (Ln 1 to Ln 10) can be arranged on any line on the screen display MSGp (Lp 1 to Lp 12).

Figure 5:
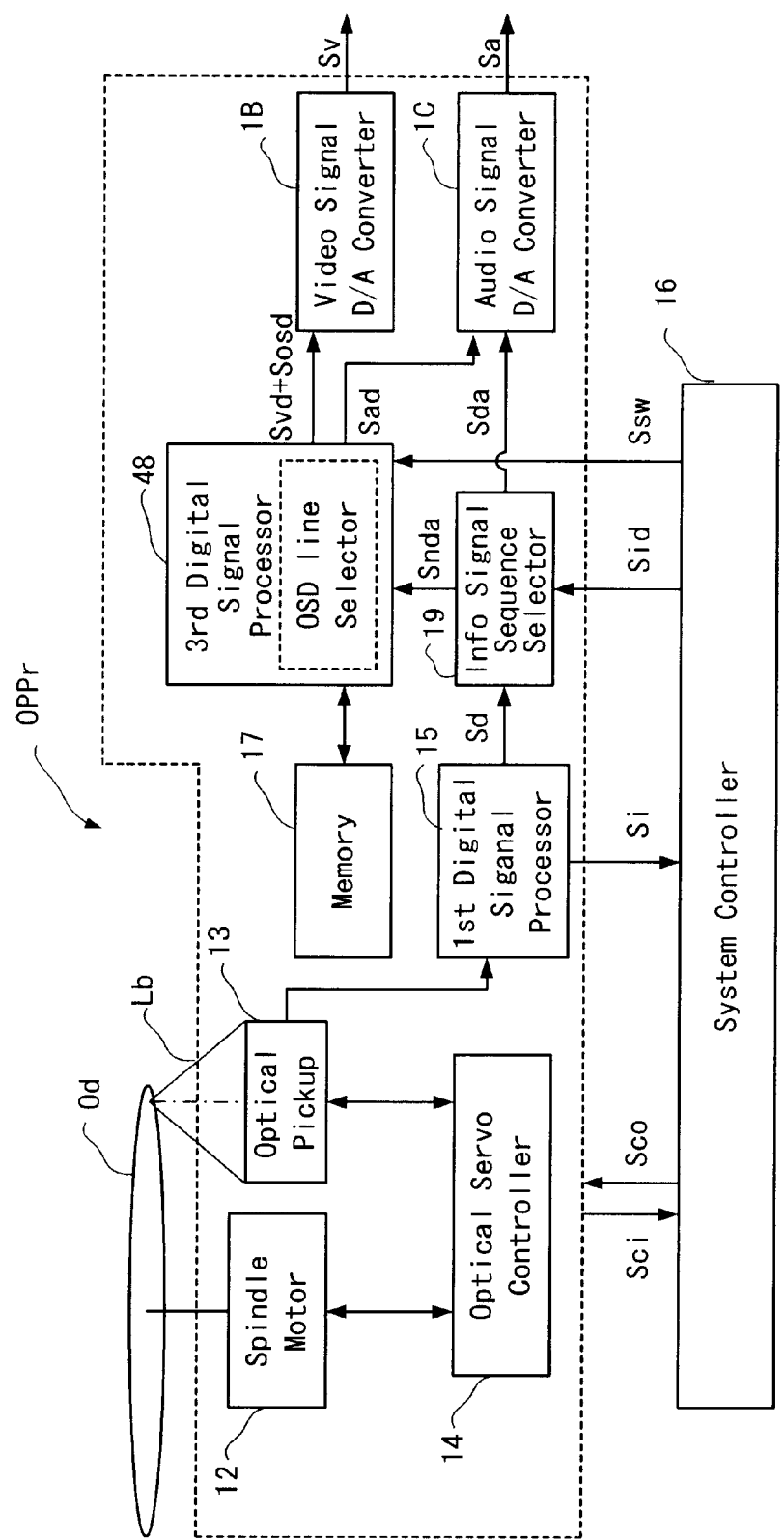
FIG. 5 is a diagram showing an example of a variation of the optical disc playback apparatus according to the embodiment of the present invention shown in FIG. 1.

By referring to FIG. 5, one example of a variation of the optical disc playback apparatus OPP according to the embodiment of the present invention is described. An optical disc playback apparatus OPPr of the example is provided with a third digital signal processor 48 in which the second digital processor 18 and the on-screen display line selector 1A of the optical disc playback apparatus OPP shown in FIG. 1 are integrally constructed.

As a result, the third digital signal processor 48 outputs the decoded digital signal sequence Svd and the digital character signal sequence Sosd together to the video signal D/A converter 1B, based on the non-music CD signal sequence Snda from the information signal sequence separator 19 and the control signal Ssw from the system controller 16. The third digital signal processor 48 also outputs the CD-DA signal sequence Sad to the audio signal D/A converter 1C.

The operation of the optical disc playback apparatus OPPr is basically the same as that of the optical disc playback apparatus OPP described by referring to FIGS. 3 and 4 except for the above described operation related to the third digital signal processor 48. Therefore, the description thereof is omitted.

(First Alternative)

Figure 6:
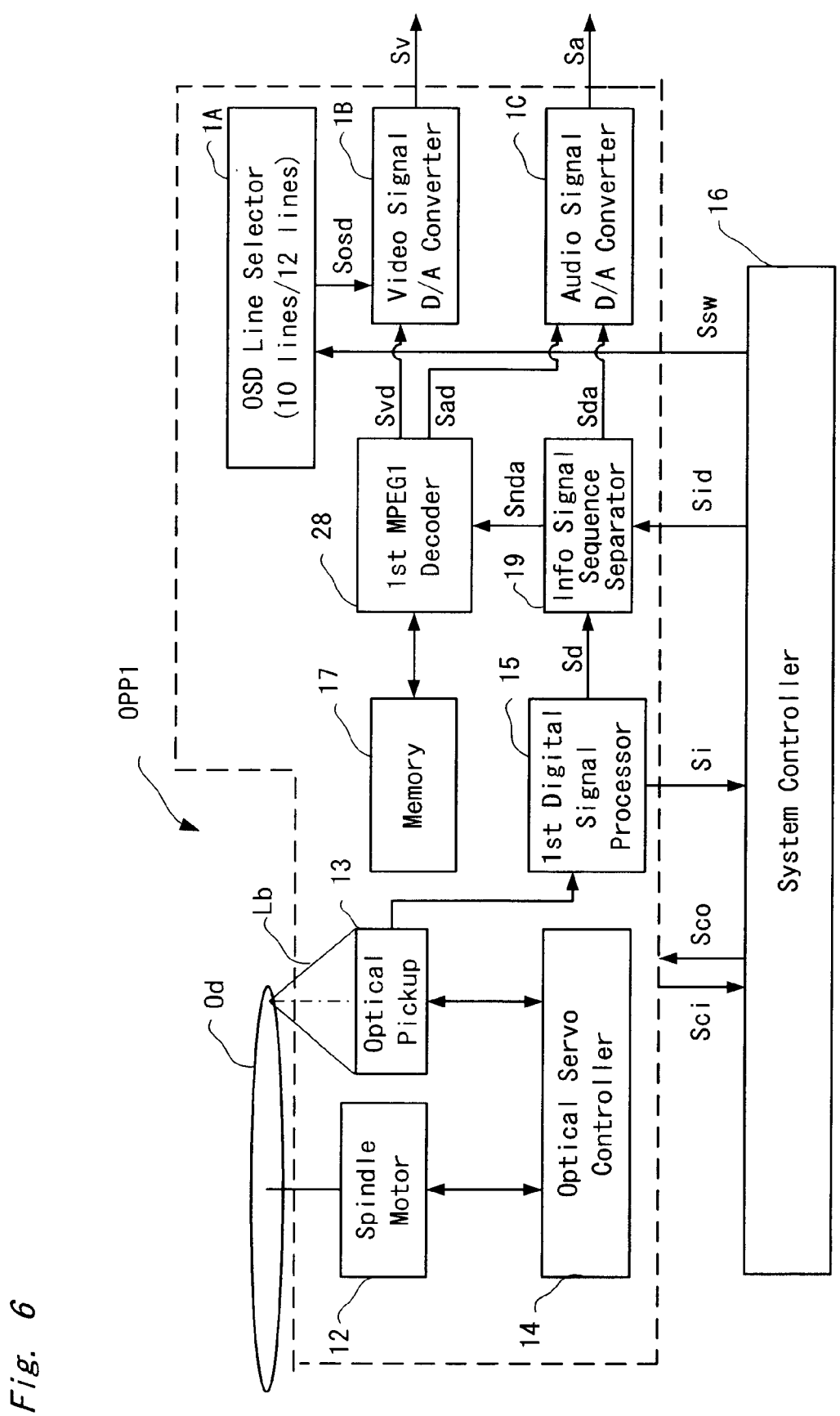
FIG. 6 is a block diagram showing a first alternative of the optical disc playback apparatus according to the embodiment of the present invention.
Figure 7:
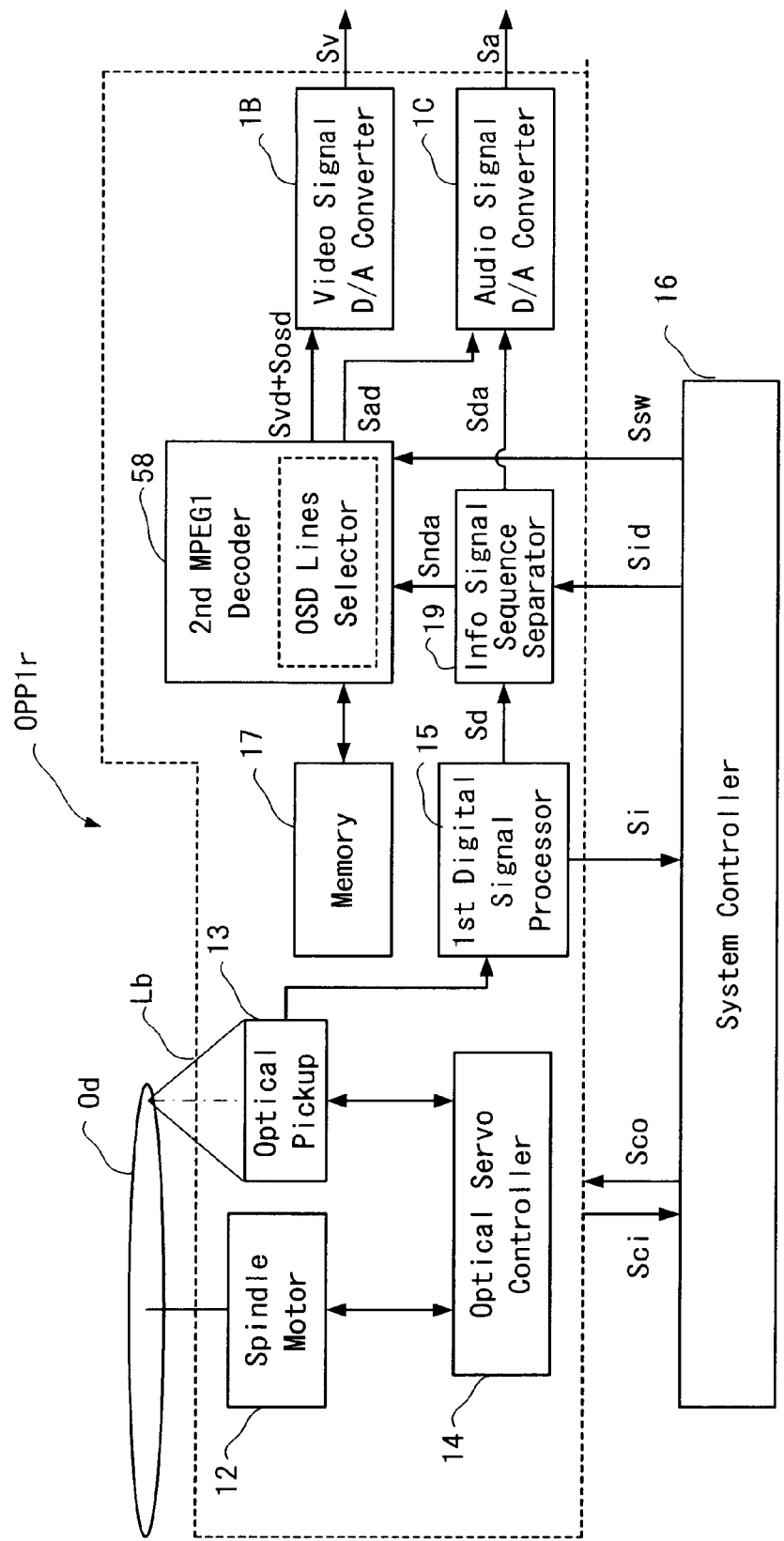
FIG. 7 is a block diagram showing a variation of the optical disc playback apparatus shown in FIG. 6.

Next, by referring to FIGS. 6 and 7, a first alternative of the optical disc playback apparatus according to the embodiment of the present invention is described. In an optical disc playback apparatus OPP1 shown in FIG. 6, the second digital signal processor 18 in the optical disc playback apparatus OPP shown in FIG. 1 is implemented by a first MPEG1 decoder 28. The first MPEG1 decoder 28 is a device for decoding MPEG1 digital signals encoded by the MPEG1 technique to generate video data and audio data, and its basic configuration is well known.

The optical disc playback apparatus OPP1 is thus suitable for a case where the non-music signal sequence Snda recorded on the optical disc Od such as video CD or karaoke CD is the MPEG1 signal sequence.

The operation of the optical disc playback apparatus OPP1 is basically the same as that of the optical disc playback apparatus OPP described by referring to FIGS. 3 and 4 except for the operation related to the above MPEG1 decoder 28. Therefore, the description thereof is omitted.

In FIG. 7, shown is one example of a variation of the optical disc playback apparatus OPP1. An optical disc playback apparatus OPPlr of the example is provided with a second MPEG1 decoder 58, in which the first MPEG1 decoder 28 and the on-screen display line selector 1A shown in FIG. 6 are integrally constructed. The second MPEG1 decoder 58 outputs the decoded digital signal sequence Svd and the digital character signal sequence Sosd together to the video signal D/A converter 1B based on the non-music CD signal sequence Snda from the information signal sequence separator 19 and the control signal Ssw from the system controller16. The secondMPEG1 decoder 58 alsooutputs theCD-DA signal sequence Sad to the audio signal D/A converter 1C.

The operation of the optical disc playback apparatus OPPlr is basically the same as that of the optical disc playback apparatus OPPl except for the above described operation related to the second MPEG1 decoder 58. Therefore, the description thereof is omitted.

(Second Alternative)

Figure 8:
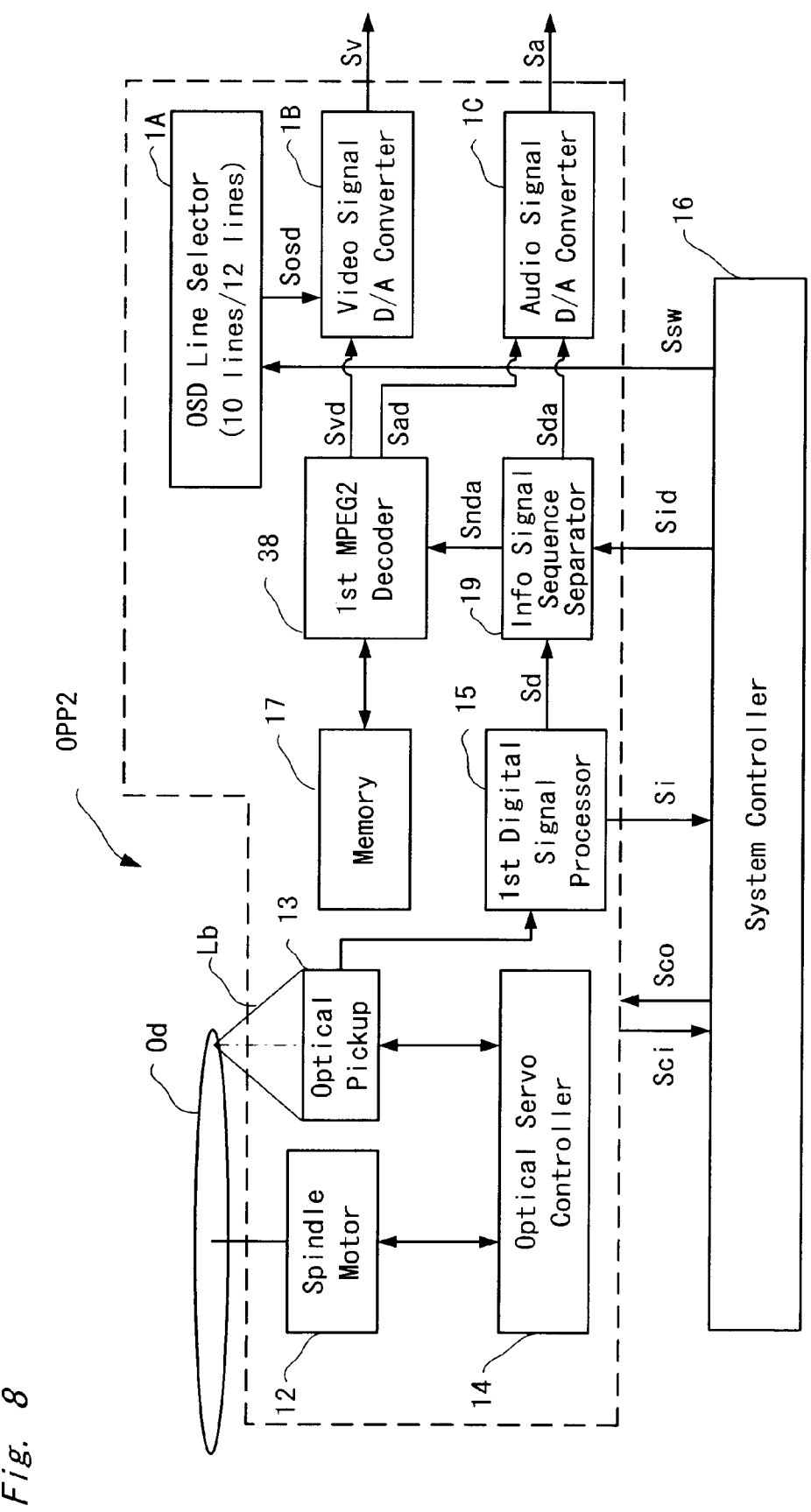
FIG. 8 is a block diagram showing a second alternative of the optical disc playback apparatus according to the embodiment of the present invention shown in FIG. 1.
Figure 9:
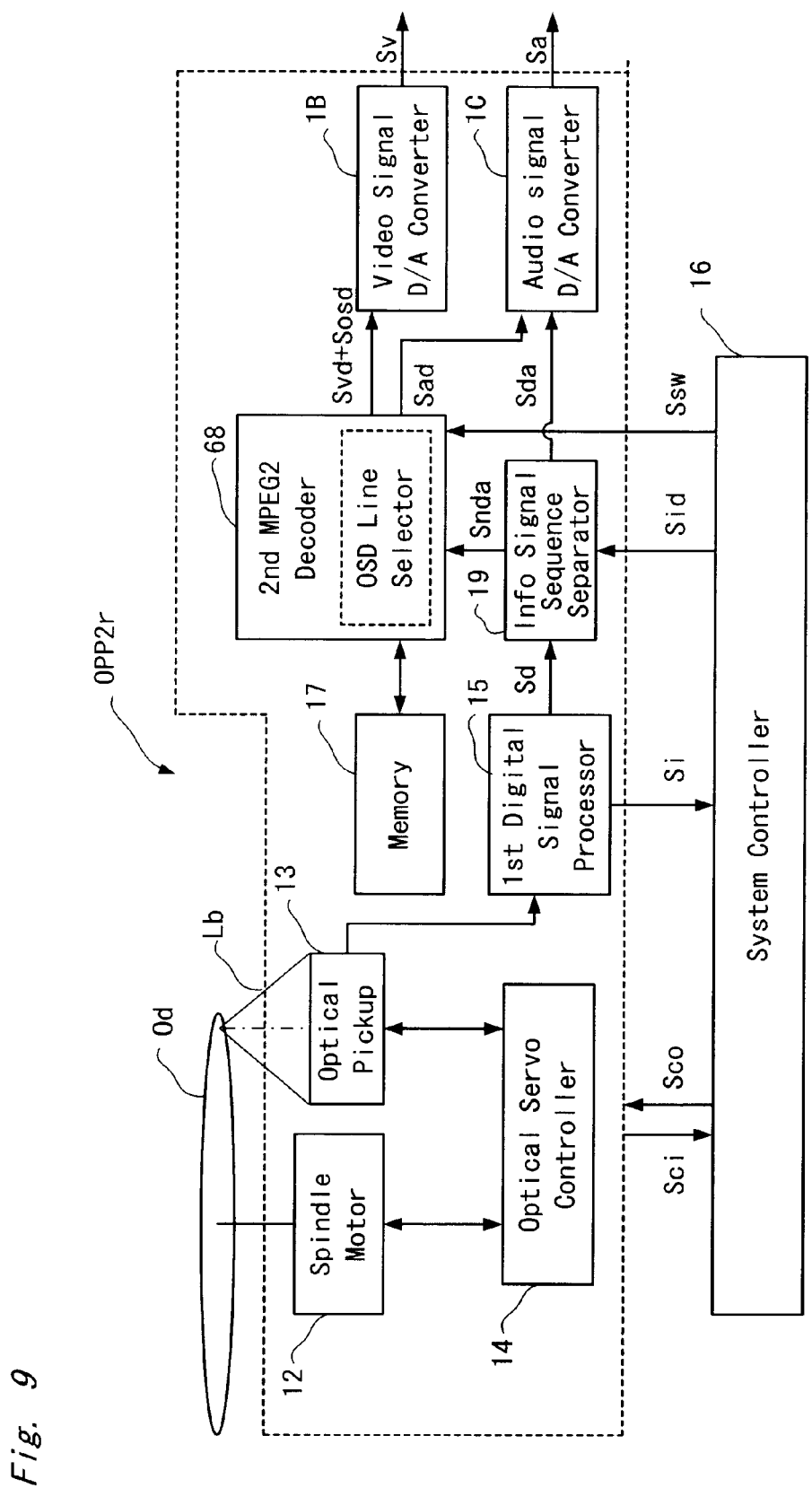
FIG. 9 is a block diagram showing a variation of the optical disc playback apparatus shown in FIG. 8.
Figure 10:
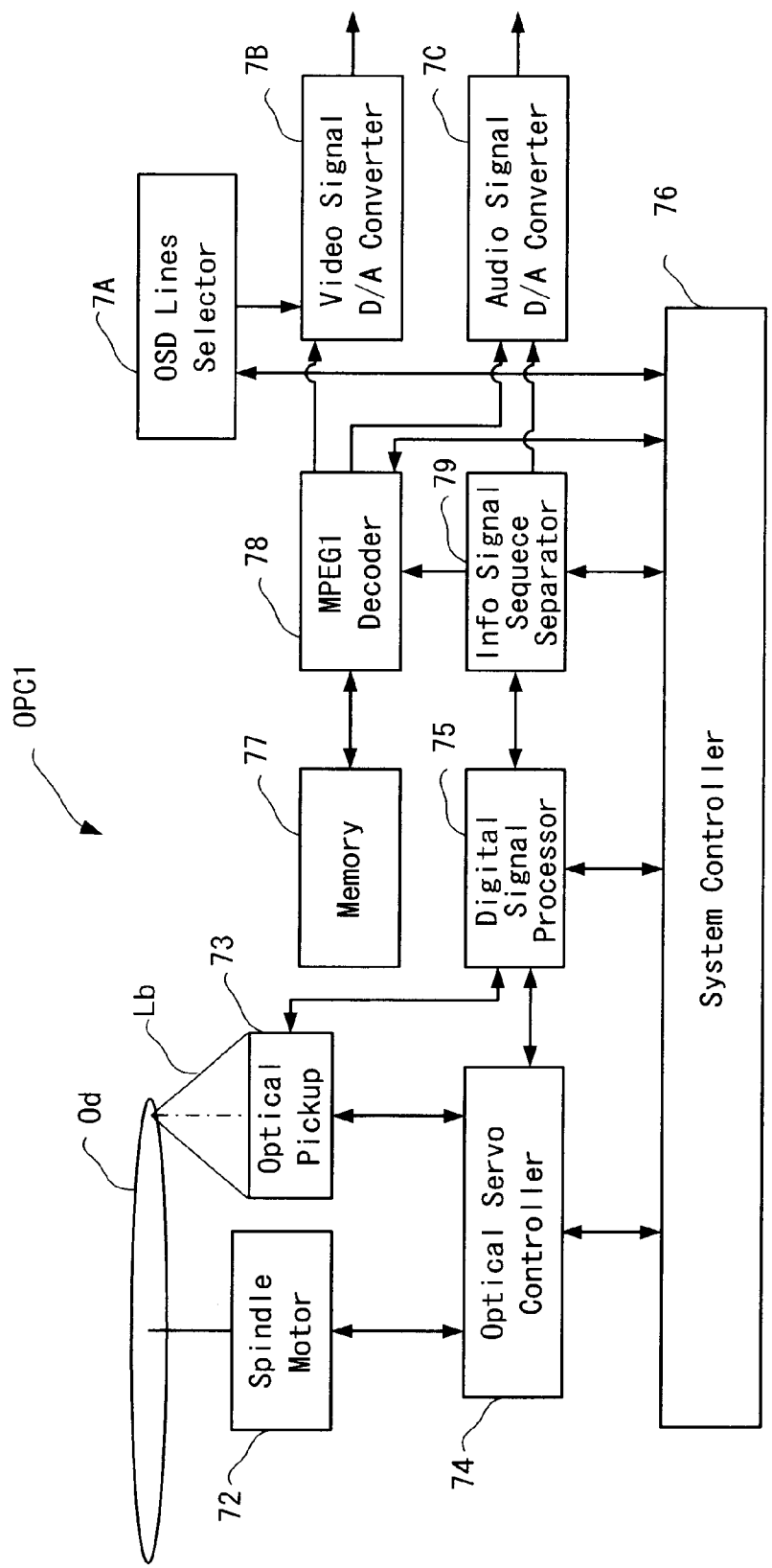
FIG. 10 is a block diagram showing an example of a conventional optical disc playback apparatus.
Figure 11:
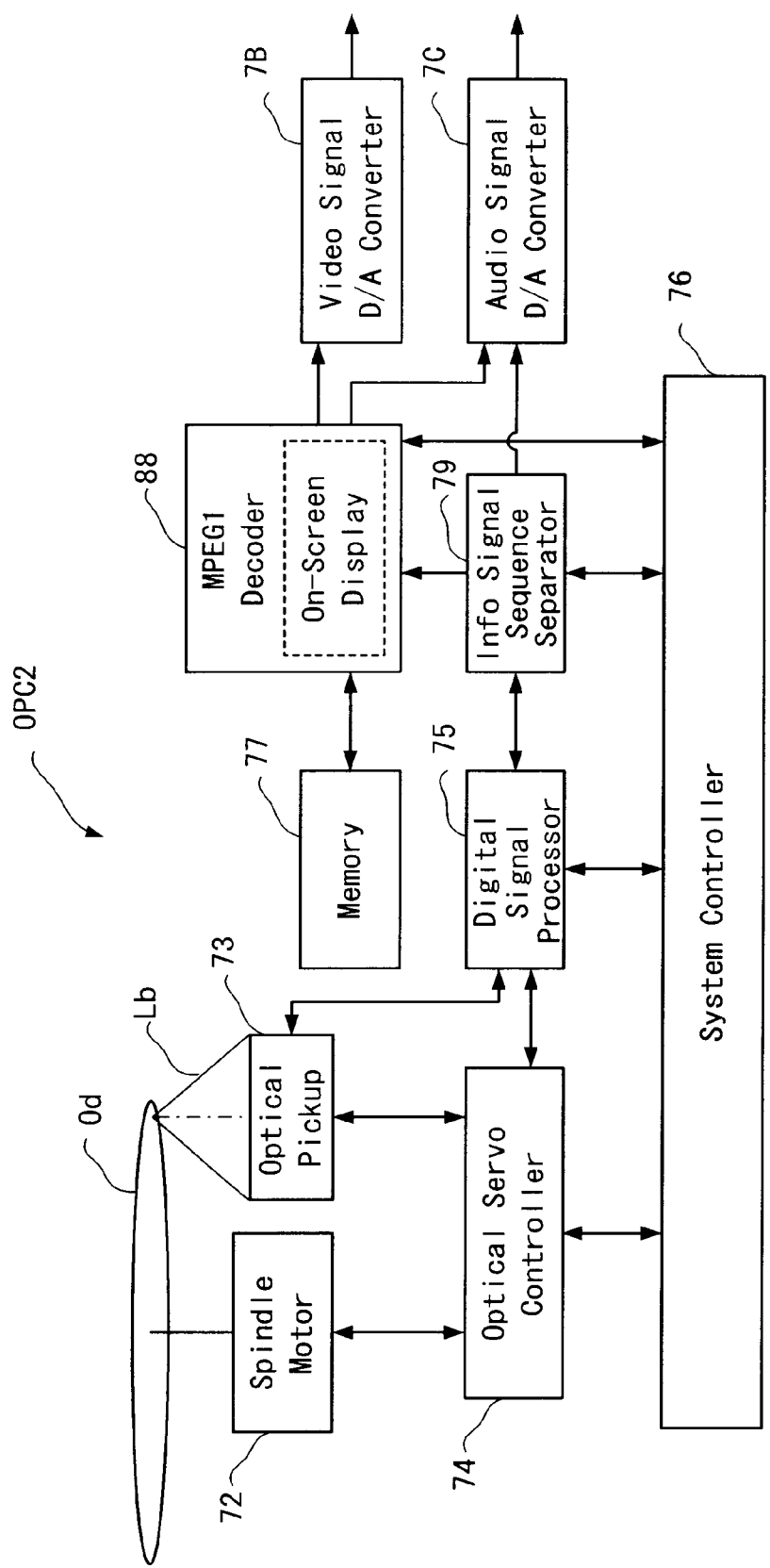
FIG. 11 is a block diagram showing an example of the conventional optical disc playback apparatus other than that shown in FIG. 10.
Figure 12:
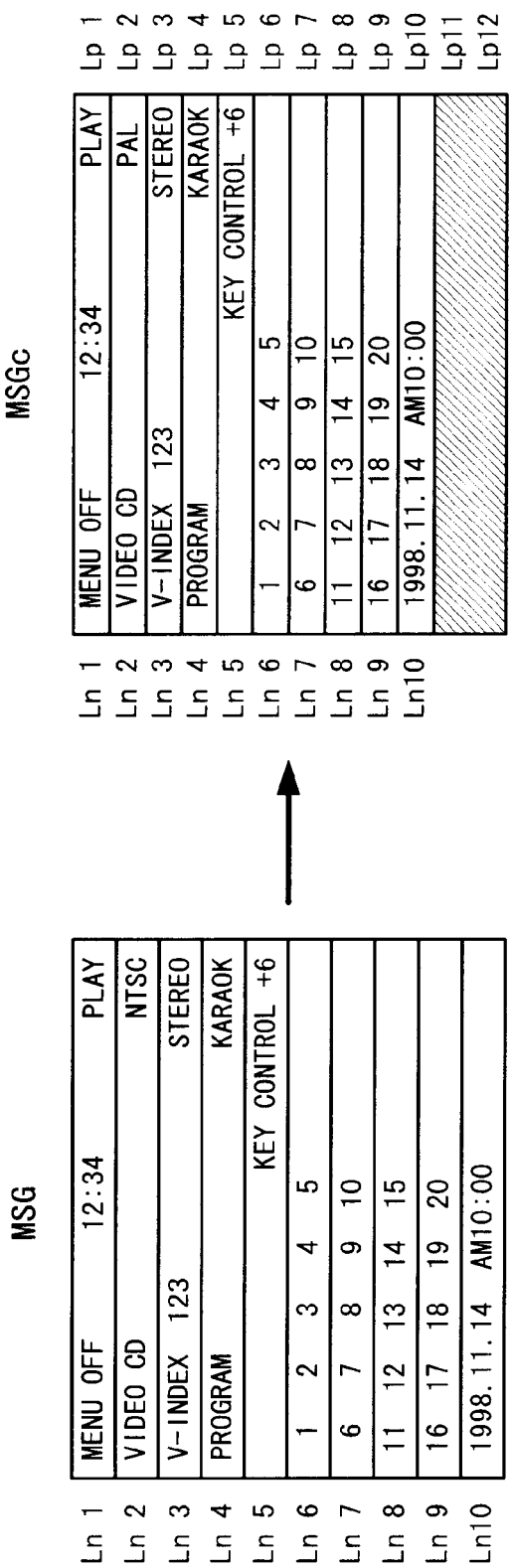
FIG. 12 is a diagram illustrating a problem relating to a construction of the on-screen message displayed on the screen according to the conventional optical playback apparatus.

Next, by referring to FIGS. 8 and 9, a second alternative of the optical disc playback apparatus according to the embodiment of the present invention is described. An optical disc playback apparatus OPP2 shown in FIG. 8 is provided with a first MPEG2 decoder 38 as an alternative to the first MPEG1 decoder 28 shown in FIG. 6. The first MPEG2 decoder 38 is a device for decoding MPEG2 digital signals encoded by the MPEG2 technique to generate video data and audio data, and its basic configuration is well known.

The optical disc playback apparatus OPP2 is thus suitable for a case where the non-music signal sequence Snda recorded on the optical disc Od such as CVD, SVCD or DVD is the MPEG2 signal sequence.

The operation of the optical disc playback apparatus OPP2 is basically the same as that of the optical disc playback apparatus OPP1 except for the operation related to the first MPEG2 decoder 38.

FIG. 9 shows one example of a variation of the optical disc playback apparatus OPP2. An optical disc playback apparatus OPP2r of the example is provided with a second MPEG2 decoder 68 in which the first MPEG2 decoder 38 and the on-screen display line selector 1A shown in FIG. 8 are integrally constructed.

The second MPEG2 decoder 68 outputs the decoded digital signal sequence Svd and the digital character signal sequence Sosd together to the video signal D/A converter 1B based on the non-music CD signal sequence Snda from the information signal sequence separator 19 and the control signal Ssw from the system controller16. ThesecondMPEG2 decoder68 alsooutputstheCD-DA signal sequence Sad to the audio signal D/A converter 1C.

The operation of the optical disc playback apparatus OPP2r is basically the same as that of the optical disc playback apparatus OPP2 except for the operation related to the second MPEG2 decoder 68.

As described in the foregoing, the optical disc playback apparatus of the present invention can playback an arbitrary optical disc Od if the second digital signal processor 18 shown in FIG. 1 is implemented by a device capable of decoding digital data recorded thereon. It is needless to say that such digital data includes, for example, data using MPEG4 technique or other data to be standardized in the future.

While the invention has been described in detail, the foregoing description is in all aspects illustrative and not restrictive. It is understood that numerous other modifications and variations can be devised without departing from the scope of the invention.

What is claimed is:

1. An optical disc playback apparatus for reproducing data recorded on an optical disc and outputting an on-screen message to be displayed in a predetermined number of lines, said apparatus comprising:

a reader operable to read recorded data from a recording surface of the optical disc; an on-screen message generator operable to generate a digital character signal sequence to be displayed as the on-screen message;

an on-screen message lines controller operable to control said on-screen message generator to change the number of lines in which the on-screen message is displayed based on the recorded data; and an optical disc determiner operable to determine a type of the optical disc based on the recorded data, wherein said on-screen message lines controller is operable to control said on-screen message generator to set the number of lines in which the on-screen message is displayed to 10 lines when the optical disc is determined to be a music CD.

2. The optical disc playback apparatus as claimed in claim 1, further comprising:

a display format determiner operable to determine a display format of the data to be reproduced based on the recorded data, wherein said on-screen message lines controller is operable to control said on-screen message generator to set the number of lines in which the on-screen message is displayed to 10 lines when the optical disc is determined to be a disc other than a music CD and when the display format of the data to be reproduced is determined to be in an NTSC format.

3. An optical disc playback apparatus for reproducing data recorded on an optical disc and outputting an on-screen message to be displayed in a predetermined number of lines, said apparatus comprising:

a reader operable to read recorded data from a recording surface of the optical disc;

an on-screen message generator operable to generate a digital character signal sequence to be displayed as the on-screen message;

an on-screen message lines controller operable to control said on-screen message generator to change the number of lines in which the on-screen message is displayed based on the recorded data, an optical disc determiner operable to determine a type of the optical disc based on the recorded data, a display format determiner operable to determine a display format of the data to be reproduced based on the recorded data, wherein said on-screen message lines controller is operable to control said on-screen message generator to set the number of lines in which the on-screen message is displayed to 10 lines when the optical disc is determined to be a music CD.

wherein said on-screen message lines controller is firther operable to control said on-screen message generator to set the number of lines in which the on-screen message is displayed to 12 lines when the optical disc is determined to be a disc other than a music CD and when the display format of the data to be reproduced is determined to be in a PAL format.

4. An optical disc playback apparatus for reproducing data recorded on an optical disc and outputting an on-screen message to be displayed in a predetermined number of lines said apparatus comprising:

a reader operable to read recorded data from a recording surface of the optical disc;

an on-screen message generator operable to generate a digital character signal sequence to be displayed as the on-screen message;

an on-screen message lines controller operable to control said on-screen message generator to change the number of lines in which the on-screen message is displayed based on the recorded data, display format optical determiner operable to determine a display format of the data to be reproduced based on the recorded data, wherein said on-screen message lines controller is operable to control said on-screen message generator to set the number of lines in which the on-screen message is displayed to 12 lines when the display format of the data to be reproduced is determined to be in a PAL format.

5. The optical disc playback apparatus as claimed in claim 1, wherein said optical disc determiner is operable to determine the type of the optical disc based on a control bit of a TOC included in the recorded data.

6. The optical disc playback apparatus as claimed in claim 2, wherein said display format determiner is operable to determine the display format of the data to be reproduced based on a sequence header included in the recorded data.

7. An optical disc playback apparatus for reproducing data recorded on an optical disc and outputting an on-screen message to be displayed in a predetermined number of lines, said apparatus comprising:

a reader operable to read recorded data from a recording surface of the optical disc;

an on-screen message generator operable to generate a digital character signal sequence to be displayed as the on-screen message;

an on-screen message lines controller operable to control said on-screen message generator to change the number of lines in which the on-screen message is displayed based on the recorded data, a signal sequence separator operable to separate a first music CD signal sequence and a non-music CD signal sequence which is a signal sequence other than the first music CD signal sequence;

a digital signal processor operable to convert video signals included in the separated non-music CD signal sequence into a decoded digital signal sequence and to convert audio data included in the non-music CD signal sequence to a second music CD signal sequence;

a video signal converter operable to convert the decoded digital signal sequence and the digital character signal sequence into analog video signals; and an audio signal converter operable to convert the first music CD signal sequence and the second music CD signal sequence into analog audio signals.

8. The optical disc playback apparatus as claimed in claim 7, wherein said digital signal processor is capable of decoding an MPEG2 signal sequence.

9. The optical disc playback apparatus as claimed in claim 7, wherein said digital signal processor is capable of decoding an MPEG4 signal sequence.

10. An optical disc playback method for outputting an on-screen message in a predetermined number of lines, said method comprising:

reading recorded data from a recording surface of the optical disc;

generating a digital character signal sequence to be displayed as an on-screen message;

controlling said generating to change the number of lines in which the on-screen message is displayed based on the recorded data; and determining the type of the optical disc based on the recorded data, wherein said controlling comprises controlling said generating to set the number of lines in which the on-screen message is displayed to 10 lines when the optical disc is determined to be a music CD.

* * * * *